United States Patent
Morizur et al.

(10) Patent No.: US 9,250,454 B2
(45) Date of Patent: Feb. 2, 2016

(54) METHOD AND SYSTEM FOR CONFIGURING A DEVICE FOR CORRECTING THE EFFECT OF A MEDIUM ON A LIGHT SIGNAL, METHOD, DEVICE AND SYSTEM FOR CORRECTING SAID EFFECT

(75) Inventors: Jean-François Morizur, Boulogne-Billancourt (FR); Hans Bachor, Wamboin (AU); Nicolas Treps, Paris (FR)

(73) Assignees: Universite Pierre et Marie Curie (Paris 6), Paris (FR); Centre National de la Recherche Scientifique, Paris (FR); Ecole Normale Superieure, Paris (FR); Australian National University, Canberra (AU)

( * ) Notice: Subject to any disclaimer, the term of this patent is extended or adjusted under 35 U.S.C. 154(b) by 66 days.

(21) Appl. No.: 13/993,805

(22) PCT Filed: Dec. 21, 2011

(86) PCT No.: PCT/EP2011/073535
§ 371 (c)(1),
(2), (4) Date: Aug. 19, 2013

(87) PCT Pub. No.: WO2012/085046
PCT Pub. Date: Jun. 28, 2012

(65) Prior Publication Data
US 2014/0118811 A1   May 1, 2014

(30) Foreign Application Priority Data
Dec. 21, 2010   (EP) .................................... 10196310

(51) Int. Cl.
*G02B 26/00* (2006.01)
*G02F 1/01* (2006.01)
*G02B 26/06* (2006.01)

(52) U.S. Cl.
CPC .............. *G02F 1/0121* (2013.01); *G02B 26/06* (2013.01)

(58) Field of Classification Search
CPC ............ G02F 2203/50; G02F 2203/12; G02F 2203/69; H04B 10/548; G01B 9/0209; G01B 9/02027; G01B 2290/70
USPC .................................................. 359/237–324
See application file for complete search history.

(56) References Cited

U.S. PATENT DOCUMENTS 5,090,795 A    2/1992   O'Meara

FOREIGN PATENT DOCUMENTS

EP            0562424         3/1993

OTHER PUBLICATIONS

Morizur, J.F. et. al, "Programmable Unitary Spatial Mode Manipulation", Journal of Optical Society of America, vol. 27, No. 11, Nov. 2010, pp. 2524-2531, Optical Society of America.
Popoff, S.M. et al, "Measuring the Transmission Matrix in Optics: An Approach to the Study and Control of Light Propagation in Disordered Media", Physical Review Letters, No. 104, Mar. 12, 2010, pp. 1-4, The American Physical Society.
Vellekoop, I.M et al, "Exploiting Disorder for Perfect Focusing", Nature Photonics, vol. 4, May 2010, pp. 320-322, Macmillian Publishers Limited.

*Primary Examiner* — Mahidere Sahle
(74) *Attorney, Agent, or Firm* — Greer, Burns & Crain, Ltd.

(57) ABSTRACT

A method and a system is provided for configuring a device for correcting the effect of a medium on a light signal having propagated through the medium, the device including at least one optical element whose phase profiles are individually adjustable. The configuring system and method include propagating a reference signal and a disordered signal obtained at the output of the medium through the correcting device. An interference parameter is measured and optimized by modifying the phase profile of each of the optical elements of the correcting device. A method and a system is also provided for correcting the effect of a medium on a light signal having propagated through the medium.

25 Claims, 4 Drawing Sheets

METHOD AND SYSTEM FOR CONFIGURING A DEVICE FOR CORRECTING THE EFFECT OF A MEDIUM ON A LIGHT SIGNAL, METHOD, DEVICE AND SYSTEM FOR CORRECTING SAID EFFECT

FIELD OF THE INVENTION

The present invention relates to a method and a system for configuring a device for correcting the effect of a medium on a light signal having propagated through said medium. The invention also relates to a method, a device and a system for correcting said effect.

BACKGROUND OF THE INVENTION

A light signal propagating through a medium, more particularly an optical medium, an optical fibre for instance, undergoes a modification applied by said medium to the signal. The signal at the output of the medium is a disordered or blurred version of the light signal input to the medium. The modification applied by the medium must be corrected in order to recover the information conveyed by the light signal.

Nowadays, there is no method or system to efficiently and completely correct the effect of a medium on light signal having propagated through said medium.

Some researchers focus on a technique consisting of computing the complete transmission matrix of a medium and use it to correct the disordered signal in order to retrieve the information conveyed by the initial light signal. Such a technique is time consuming because it involves a series of measurements and needs an important computation power. Moreover the calculation involved may introduce errors.

The inventors of the present invention have mathematically proved that a device comprising several reflexion elements separated by a static propagation medium may be used to realise any spatial transformation on a light signal (*Programmable Unitary Spatial Modes Manipulation*, Jean-François Morizur, Lachlan Nicholls, Pu Jian, Seiji Armstrong, Nicolas Treps, Boris Hage, Magnus Hsu, Warwick Bowen, Jiri Janousek, Hans-A. Bachor).

OBJECTS OF THE INVENTION

It is an object of the present invention to overcome the aforementioned drawbacks.

Another object of the present invention is to provide a method and a system making it possible to efficiently correct the effect of a medium on a light signal having propagated through said medium.

Another object is furthermore to provide an industrially applicable method and a system making it possible to correct the effect of a medium on a light signal having propagated through said medium.

Another object is furthermore to provide a method and a system making it possible to correct the effect of a medium on a light signal having propagated through said medium in a faster and inexpensive fashion.

Yet another object of the invention is to provide a method and a system making possible a complete correction of the effect of a medium on a light signal having propagated through said medium.

SUMMARY OF THE INVENTION

The invention is disclosed as precised in the appended claims.

Such objects are accomplished through a method for configuring a device to correct the effect of a medium on a light signal having propagated through said medium, said device comprising at least one optical element whose spatial phase profile is individually adjustable, said method comprising several iterations of the following steps:

propagating a first light signal through said medium, said propagating step providing a so-called disordered signal, propagating said disordered signal through said device, propagating a second light signal, called reference signal, through said device, said reference signal being identical to said first signal, optimizing the interference between said disordered signal and said reference signal, said optimizing step comprising at least one iteration of the following steps for at least one optical element:

measuring at least one interference parameter between said disordered signal and said reference signal, and modifying the phase profile of at least one optical element depending on said interference parameter.

By "medium" it is meant a medium or a combination of media, each medium being a natural or artificial medium.

A single optical element, comprising independent sections whose phase profiles are individually adjustable, may be used to perform several successive reflexions or phase changes, in order to avoid the use of several such optical elements.

The method according to the invention makes it possible to configure a device to efficiently and completely correct the effect of a medium on a light signal having propagated through said medium.

The present invention provides a method that is simple to implement.

Indeed, the configuration of the correcting device is entirely based on the disordered signal propagated through the correcting device and doesn't comprise any computation of the transmission matrix of the medium. Thus, the errors that may be caused by such a computation operation are avoided and the method according to the invention is industrially applicable, less expensive and less time consuming than the prior art techniques.

The reference signal may be propagated through the device in the opposite direction to that of the disordered signal.

The step of measuring an interference parameter may comprise a step of measuring for each optical element:

an interference parameter for one or several zones of each optical element, and/or an interference parameter for each pixel of each optical element, and/or an interference parameter for the whole optical element.

In the present application, a pixel is defined as the smallest area of an optical element for which it is possible to modify the phase profile.

Thus, for each optical element, it is possible to focus on a part of the optical element corresponding to a pixel of its phase profile or a wider zone of the optical element. Such a feature decreases the configuration time of the correcting device.

The interference parameter may comprise a parameter relative to the phase difference between the disordered signal and the reference signal.

More particularly the interference parameter may comprise a parameter relative to the phase of the interference signal at each pixel or zone of the optical element.

In a particular embodiment of the method according to the invention the interference parameter may comprise, for an optical element, a parameter relative to the intensity of the interference signal, more particularly the light intensity, for each pixel or zone of the optical element, or the total light intensity, of the interference signal obtained by interference of the reference signal and the disordered signal. The total light intensity of the interference signal for an optical element corresponds to the sum of the intensities measured for all the zones or pixels of the optical element.

Indeed, the light intensity of the interference between the disordered signal and the reference signal may be used to measure the powers and the phase difference between these two signals.

In a particular embodiment of this feature, the method according to the invention may comprise a step to oscillate in time the overall phase of the reference signal and/or first signal.

Such a modulation makes the intensity of the interference between the disordered signal and the reference signal oscillate in time. For each zone of the optical element where the intensity of the interference is measured the local phase difference relative to the other zones between the reference signal and the disordered signal can be computed.

In a preferred embodiment the phase of the interference signal at each pixel or zone of the optical element with respect to a reference pixel or a predetermined phase reference is used to decide the necessary modification to the phase profile of this pixel or zone.

The step of modifying the spatial phase profile of an optical element may comprise modifying the phase delay applied by at least one zone and/or at least one pixel of said optical element to a light signal.

A feature of the method according to the invention is that the reference signal, the first signal or both the reference signal and the first signal may be modulated spatially before propagating through the medium and the correcting device.

In a particular embodiment of this feature, the method according to the invention may comprise a step to modulate the intensity profile of the reference signal and/or first signal.

The method according to the invention may also comprise a step to produce the reference signal and the first signal from two or more spatially separated incoherent light sources. Indeed this incoherence is equivalent to a spatial modulation of the overall source.

Such a spatial modulation makes it possible to configure the device, more particularly the spatial phase profile of each optical element, so that any effect of any complex medium on any light signal is corrected. Indeed, if the reference and first signals were not spatially modulated, then the spatial profile of the reference and first signals would remain static. The correcting device would then be configured according to only one spatial profile and would be able to correct the disordered signal only for one spatial profile.

The method according to the invention may also comprise a step for measuring a visibility parameter.

Indeed, an overall phase modulation applied to the reference signal or the disordered signal makes it possible to measure an interference visibility parameter between the reference signal and the disordered signal. Such an interference visibility parameter may be measured at a given position, for instance before, after or in the correcting device as the interference visibility parameter measured between two light signals remains identical whatever the measurement position.

In a preferred embodiment of the method according to the present invention, the reference signal is phase modulated before propagating through the correcting device. An interference parameter is measured for each pixel of each optical element. The measured interference parameter is the intensity of the interference signal.

As the reference signal is modulated, the intensity of the interference signal measured at each pixel of an optical element oscillates in time.

The phase difference between these oscillations and the reference oscillation measured at a pixel with high intensity is calculated.

By modifying the phase delay applied by each pixel of an optical element, the phase difference are reduced to 0 and all the oscillating interference signals measured for the optical element are synchronised. This synchronisation increases the visibility of the interference between the reference signal and the disordered signal.

The optimization step may be conducted individually for each optical element and one after each other whatever the order.

The method according to the invention may also comprise a step of generating the first signal and the reference signal from a unique light signal. The light signal may be divided into two light signals, one being the first signal and the other the reference signal.

The invention also relates to a device for correcting the effect of a medium on a light signal having propagated through said medium, comprising at least one optical element whose spatial phase profile is individually adjustable and configured according to the configuration method according to the invention.

In a particular embodiment of the device according to the invention, the two optical elements are separated by a combination of lenses and free space propagation.

In a particular embodiment of the device according to the invention, at least one optical element is a spatial light modulator or a deformable mirror.

The invention also relates to a method for correcting the effect of a medium on a light signal having propagated through said medium, said method implementing a device comprising at least one optical element whose phase profile is individually adjustable, said method comprising:
  a configuration phase for configuring said device according to the configuration method according to the invention, and
  a correcting phase correcting said signal with said calibrated device.

The correcting method according to the present invention may also comprise at least one adjusting step for adjusting the configuration of the device if changes occur in the medium during the correcting phase.

In a particular embodiment of the method according to the invention, a control light signal is sent regularly through the system to readjust the device, using the configuration method. This control light signal can be different from the light signal used in the configuration phase.

In a particular embodiment of the method according to the invention, the control light signal is sent through the output of the device, and is reflected at the input of the complex medium. Thus, the control light goes through the correcting device, the medium, the medium again and finally the correcting device again. After the configuration phase, the device corrects the effect of the medium. Additional small changes occurring in the medium can be corrected using the calibration method with the control light.

The invention also relates to a system for configuring a device for correcting the effect of a medium on a light signal having propagated through said medium, said device comprising at least one optical element whose spatial phase profile is individually adjustable, said system comprising:

means for propagating a first light signal through said medium, said medium thus providing a so-called disordered signal, means for propagating said disordered signal through said device, means for propagating a second light signal, called reference signal, through said device, said reference signal being identical to said first signal, means for measuring an interference parameter between said disordered signal and said reference signal, and means for modifying the phase profile of at least one of said optical elements depending on said interference parameter.

The means for propagating the reference signal may be adapted to propagate the reference signal through the device in the opposite direction to that of the disordered signal The system according to the invention may also comprise modulation means to introduce an overall phase modulation on the reference signal or the disordered signal before propagating said signal through the correcting device.

The system according to the invention may also comprise an element to modulate the spatial profile of the reference signal, the first signal or both these signals before they are sent in the medium or the correcting device.

The measuring means may comprise one CCD camera or one CCD camera for each optical element. Such a CCD camera may be configured for measuring an interference parameter for each pixel of the optical element.

The system according to the invention may also comprise reflexion means to transmit to the CCD camera a part of the interference signal obtained by interference of the disordered signal and the reference signal.

The means for modifying the phase profile of an optical element may comprise at least one actuator for each optical element, more particularly an actuator for each zone or pixel of each optical element. Such actuators may be integrated to the optical elements.

The invention also relates to a system for correcting the effect of a medium on a light signal having propagated through said medium, said system comprising:

a correcting device comprising at least one optical elements whose spatial phase profile is individually adjustable, and a configuring system according to invention.

The invention also relates to a computer program comprising the instructions to implement the steps of a configuration method according to the present invention when said computer program is executed by a computer or computing means.

Such a computer program makes it possible to:

simulate, on a computer or computing means, the correction of an effect of a given medium on a light signal to determine the phase profile of at least one optical element of a given correcting device, and configure said at least one optical element of said correcting device once the phase profile is determined by simulation.

Thus, for a given medium and a given correcting device, the phase profiles of each optical element of said correcting device may first be determined on a computer by simulation. When the correction if satisfactory, the phase profiles of each optical element is set and the device is then ready to use.

The methods, the device, the systems and the computer program according to the present invention may also be used to apply a given deformation to a light signal.

In this case, the given deformation is the deformation applied by the medium through which the first signal propagates. The disordered signal thus obtained at the output of the medium is used as reference signal in the methods, device, systems and computer program according to the present invention.

The second signal, identical to the first signal, is used as the signal to be modified by the methods, device, systems and computer program according to the invention so that said second signal is modified to be identical to the disordered signal.

To put it in another way, in this case, the reference signal and the second signal are switched.

BRIEF DESCRIPTION OF THE DRAWINGS

The new and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION

In the following specifications, elements common to several figures are referenced through a common identifier.

DETAILED DESCRIPTION OF THE INVENTION

Figure 1:
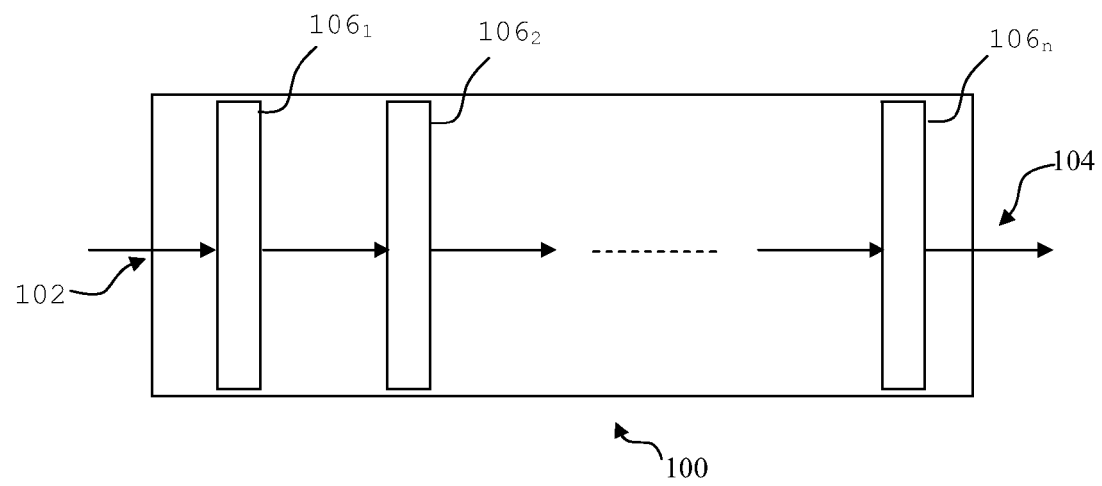
FIG. 1 schematically represents an example of a correcting device.

FIG. 1 schematically represents an example of a correcting device.

The correcting device 100 comprises at least one input 102 and at least one output 104.

Between the input 102 and the output 104, the correcting device 100 comprises several optical elements $106_1$-$106_n$. Each optical element 106 has an adjustable spatial phase profile. For instance, each optical element 106 may be a spatial phase modulator (SLM) or a deformable mirror (DM). Each optical element 106 is separated from another optical element 106 by free space propagation and a lens (not represented), which perform an optical transform.

When configured, a disordered signal is input to the correcting device 100 and propagates across the optical elements 106 one after another. After the last optical element $106_n$, the disordered signal is corrected and the correcting device provides the corrected version of the disordered signal.

In another embodiment of the correcting device, the several optical elements $106_1$-$106_n$ may be replaced by independent section of a single optical element, i.e. a spatial phase modulator or a deformable mirror.

Figure 2:
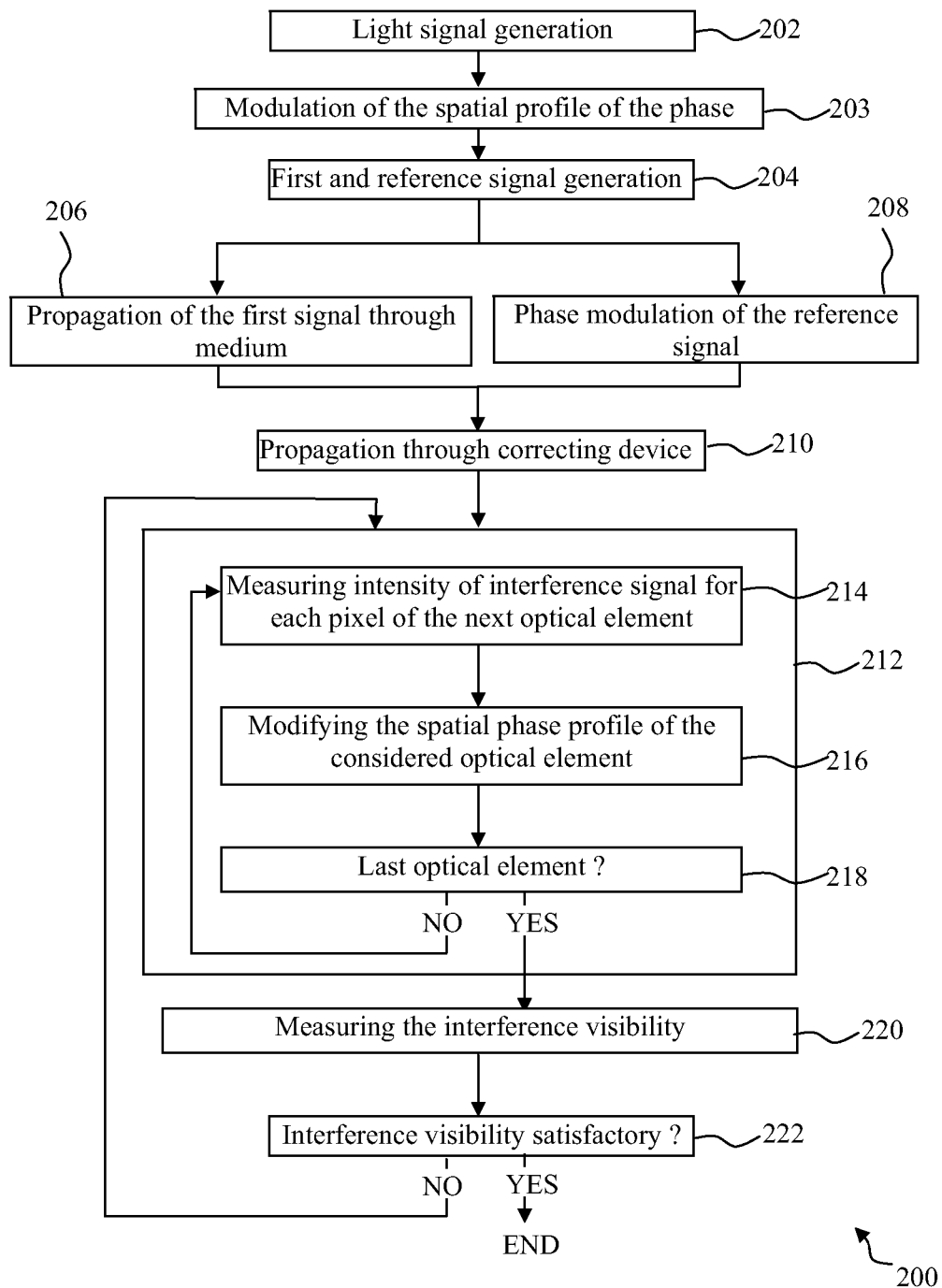
FIG. 2 is a block diagram of an embodiment of the configuration method according to the invention.

FIG. 2 is a block diagram of an embodiment of the configuration method according to the invention.

The configuration method 200 comprises a first step 202 of generation of a light signal.

At a step 203 the spatial profile of the light signal is modulated using an accousto-optic modulator, a simple chopper or another mean to change the spatial profile of the light. The spatial modulation may be random.

At a step 204 the light signal is divided into two identical light signals called the first signal and the reference signal.

At a step 206 the first signal is propagated through a medium, and thus a disordered signal is obtained at the output of the medium.

At a step 208, the reference signal is phase modulated.

At step 210, the disordered signal and the reference signal are propagated through the correcting device, i.e. the optical elements, in opposite directions.

The propagation of the disordered signal and the modulated reference signal through each optical element generates an interference signal at each optical element, and more particularly at each pixel of each optical element.

At step 212 an optimization of the interference between the disordered signal and the modulated reference signal is performed.

The optimization step 212 comprises a step 214 measuring an interference parameter, i.e. the light intensity of the interference signal, for each pixel of an optical element of the correcting device. For each pixel, the measured intensity of the interference signal oscillates due to the phase modulation of the reference signal. Thus, for a given optical element there are as many oscillating signals as pixel.

The optimization step 212 also comprises a step 216 for modifying the spatial phase profile of the considered optical element in order to synchronise all the measured oscillating signals.

The synchronisation for an optical element may be performed as follows. A reference pixel is chosen among all the pixels of the optical element. For each pixel of the optical element:
 the phase of the interference signal is measured,
 a phase delay is determined by comparing the measured phase to the phase of the reference pixel,
 the spatial phase applied by the pixel is modified in order to decrease/cancel said phase delay.

Instead of choosing a reference pixel, a reference phase may be chosen and the phase delay for each pixel may be determined by comparing the phase of the interference signal of each pixel to the reference phase.

Steps 214 and 216 are realised for each optical element of the correcting device whatever the order. This condition is verified at step 218 that makes sure that steps 214 and 216 are realised for all optical elements of the correcting device.

When steps 214 and 216 are realised for all the optical elements of the correcting device, a second interference parameter, i.e. the interference visibility, is computed at step 220.

At step 222 the interference visibility value is tested.

If the value of the interference visibility is satisfactory than the configuration method is ended and the device is ready to use.

Instead of the visibility, other measurements can be used as termination parameters such as the contrast of the output image of the system, a local contrast of the output image, the fidelity to a desired intensity profile, the fidelity to a desired phase profile, the fidelity to a desired intensity and phase profile, the symmetry of the output image, the asymmetry of the output image, the phase differences measured at different points in the device, the intensity profiles measured at different points in the device.

In the contrary, i.e. if the value of the interference visibility is not satisfactory, for instance less than a predetermined threshold, then the optimization step 212 is repeated until a satisfactory value of the interference visibility is obtained.

Figure 3:
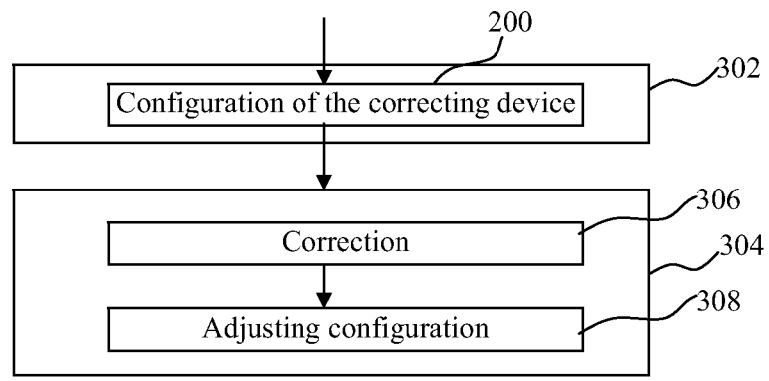
FIG. 3 is a block diagram of an embodiment of the correction method according to the invention.

FIG. 3 is a block diagram of an embodiment of the correction method according to the invention.

The correction method 300 represented en FIG. 3 comprises a configuration phase 302, configuring a correction device as the device 100 represented on FIG. 1 and realised according to the configuration method 200 represented en FIG. 2.

The correction method 300 also comprises a correcting phase 304, after the configuration phase 302.

The correcting phase comprises a step 306 for correcting a disordered signal with the configuration device.

The correcting phase also comprises a step 308 for adjusting the configuration of the device if changes occur on the medium during the correcting step. Then the correcting step 306 is stopped. The adjusting step 308 is realised. When the adjusting step 308 is finished the correcting step 308 is continued.

Figure 4:
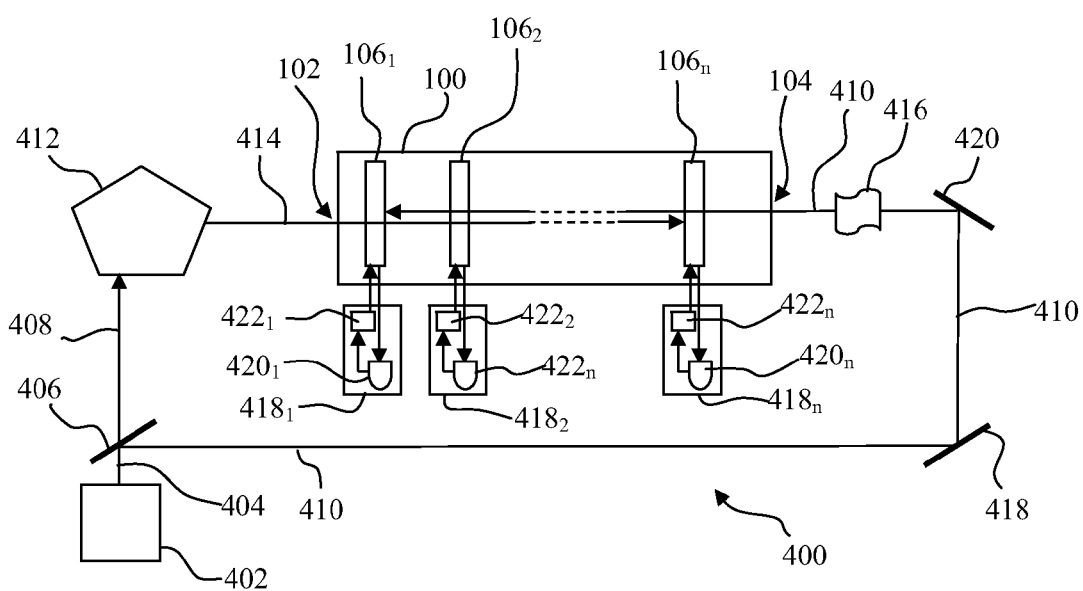
FIG. 4 schematically represents an embodiment of the correcting system according to the invention.

FIG. 4 schematically represents a correcting system 400 according to the invention.

The correcting system 400 represented on FIG. 4 comprises a source 402 providing a spatially modulated light signal 404. The light signal 404 is divided into two equal and identical light signals by a semi-reflective mirror 406. Thus, a first light signal 408 and a reference light signal 410 are obtained.

The first light signal 408 is propagated through the medium 412 and a disordered light signal 414 is obtained at the output of the medium 412.

The reference signal 410 is entered into a phase modulator 516 thanks to two reflective mirrors 418 and 420.

The disordered signal 414 is propagated through the correcting device 100 from the input 102 to the output 104 and crosses all the optical elements 106 from the first optical element $106_1$ to the last optical element $106_n$.

The modulated reference signal 410 is propagated through the correcting device 100 from the output 104 to the input 102 and crosses all the optical elements 106 from the last optical element $106_n$ to the first optical element $106_1$.

The propagation of the disordered signal 414 and the modulated reference signal 410 causes an interference signal in the correcting device, for instance at each optical element 106.

The system 400 comprises an optimization module $418_1$-$418_n$ for each optical element.

Each optimization module $418_i$ comprises a CCD camera $420_i$ measuring the amplitude of the interference signal for each pixel of the optical element $106_i$ and at least one actuator $422_i$ adapted to modify the phase profile of each pixel of the optical element $106_i$.

The actuator $422_i$ realizes a stochastic modification of the phase delay applied by each pixel of the optical element $106_i$.

The optimization is realised for every optical element 106 one after another. For example, the optimization is realised for the first optical element $106_1$, then the second optical element $106_2$ and so on. When one optimization step is realised for each element, then a first optimization cycle is completed. A second optimization cycle is then realised and so on.

The optimization is stopped when a desired value of the interference visibility is reached, for example 0.95.

The order in which the optimization is realised on the optical elements 106 is not important.

Figure 5:
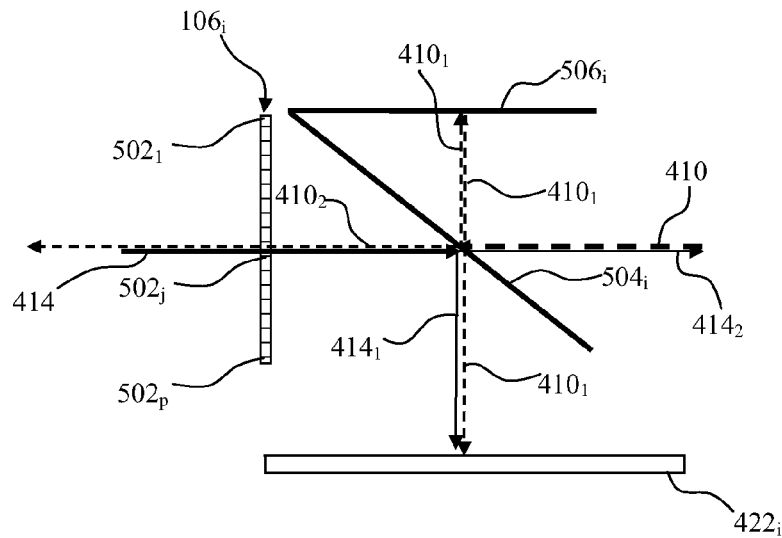
FIG. 5 schematically represents the means for measuring the amplitude of the interference signal for each pixel of an optical element.

FIG. 5 is a schematic representation of the means for measuring the amplitude of the interference signal for each pixel of an optical element.

Let's consider that all the optical elements 106 comprise the same number of pixels, for instance p pixels.

The CCD camera $422_i$ is adapted and configured to measure the intensity of the interference signal for each pixel 502 of the pixels $502_1$-$502_p$ of the optical element $106_i$.

The intensity of the interference signal is measured in the same way for each pixel $502_j$ of the optical element $106_i$.

The disordered signal 414 is reflected on a semi-reflective mirror $504_i$ associated to the optical element $106_i$. A part $414_1$ of the disordered signal having crossed the pixel $502_j$ of the optical element $106_i$ is projected to the CCC camera $422_i$. A second part $414_2$ continues to propagate to the optical element $106_{i+1}$.

The modulated reference signal 410 coming from the optical element $106_{i+1}$ and going to cross the pixel $502_j$ of the optical element $106_i$ is reflected on the semi reflective mirror $504_i$. A part $410_1$ of the modulated reference signal 410 is then reflected to a mirror $506_i$ which in turn reflects this part $410_1$ of the modulated reference signal 410 to the CCD camera $422_i$. A second part $410_2$ continues to propagate to the optical element $106_i$, more particularly to the pixel $502_j$ of the optical element $106_i$.

Thus the intensity of the interference signal is measured by the CCD camera 522 for each pixel 502 of each optical element 106.

Figure 6:
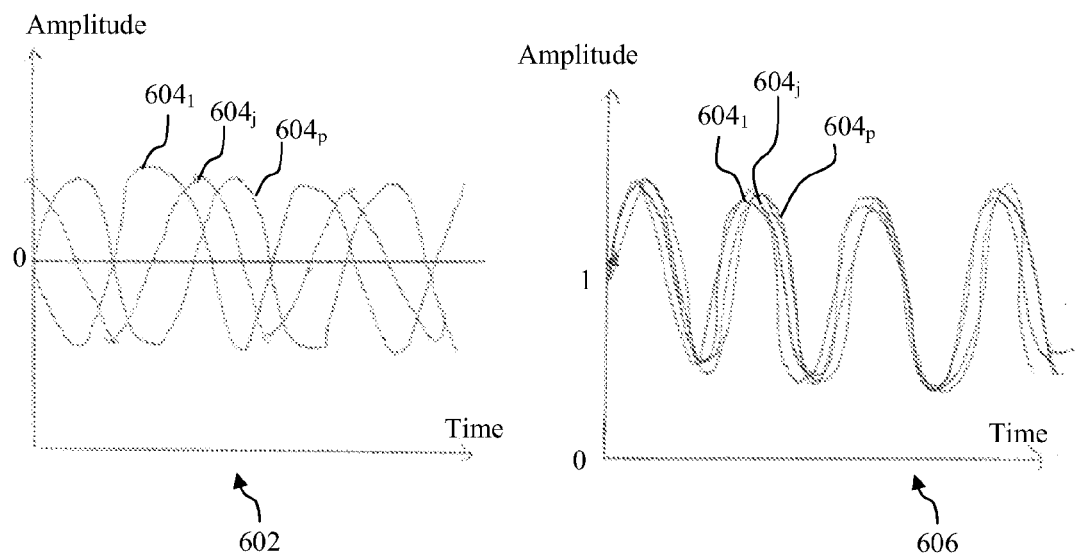
FIG. 6 schematically represents the amplitude of the interference signal measured for each pixel of an optical element before and after configuration.

FIG. 6 schematically represents the intensity of the interference signal measured for each pixel of an optical element, for example at the step 214 of the configuration method represented on FIG. 2.

The oscillating curves $604_1$, $604_j$ and $604_p$ on the graph 602 of FIG. 6, schematically represent the intensity of the interference signal measured for the pixels 1, j and p of an optical element 106 before calibration.

Before calibration, the oscillating intensity curves 604 are not synchronised and the total intensity, i.e. the sum of the intensity measured for each pixel, does not oscillate. It means that the value of the interference visibility parameter is 0.

The oscillating curves $604_1$, $604_j$ and $604_p$ on the graph 606 of FIG. 6, schematically represent the intensity of the interference signal measured for the pixels 1, j and p of an optical element 106 after calibration.

After calibration, the oscillating amplitude curves 604 are well synchronised and the total intensity, i.e. the sum of the intensity measured for each pixel is maximal.

The device is well configured and is able to correct the disordered signal and recover the initial signal.

The invention is particularly adapted to correct the effect of an optical fibre on a light signal.

Alternative Embodiments

In the given examples, the methods, the device and the systems according to the invention has been particularly shown and described for the correction of the effect of a medium on a light signal. However, the methods, the device and the systems according to the invention may also be used to apply a given deformation to a light signal.

In such a use, the medium is used to apply the given deformation and:
- the method 200 and system 400 for configuring the correcting device 100 are identical, and the input 102 and the output 104 of the correcting device are switched when the device is in use, i.e. after the device has been configured, for example when the device is used in method 300; or
- the device 100 is used as it is, and the reference signal 410 and the disordered signal 414 are switched in the methods 200 and 300 and in the system 400, i.e. the disordered signal 414 is used as the reference signal and the reference signal us used as the disordered signal.

While the invention has been particularly shown and described mainly with reference to a preferred embodiment, it will be understood that various changes in form and detail may be made therein without departing from the spirit, and scope of the invention.

The invention claimed is:

1. A method for configuring a device to correct the effect of a medium on a light signal having propagated through said medium, said device comprising at least one optical element whose spatial phase profile is individually adjustable, said method comprising the following steps:
   propagating a first light signal through said medium, said propagating step providing a disordered signal;
   propagating said disordered signal through said device;
   propagating a second light signal, called reference signal, through said device, said reference signal being identical to said first signal;
   optimizing interference between said disordered signal and said reference signal, said optimizing step comprising at least one iteration of the following steps for at least one optical element:
   measuring at least one interference parameter between said disordered signal and said reference signal; and
   modifying the phase profile of at least one optical element depending on said interference parameter.

2. The method according to claim 1, wherein the step of measuring an interference parameter comprises a step of measuring for each optical element:
   an interference parameter for several zones of each optical element, and/or
   an interference parameter for each pixel of each optical element, and/or
   an interference parameter for the whole optical element.

3. The method according to claim 1, wherein the interference parameter comprises a parameter relative to the intensity of the interference signal obtained by interference of the reference signal and the disordered signal.

4. The method according to claim 1, wherein the step of modifying the spatial phase profile of an optical element comprises modifying the phase delay applied by at least one zone and/or at least one pixel of said optical element to a light signal.

5. The method according to claim 1, also comprising a step for phase modulating the reference signal before propagating it through the device.

6. The method according to claim 5, also comprising a step for measuring an interference visibility parameter between the reference signal and the disordered signal.

7. The method according to claim 1, wherein the optimizing step is realised for each optical element of the correcting device one after another.

8. The method according to claim 1, also comprising a step of generating the first signal and the reference signal from a unique light signal.

9. The method according to claim 8, comprising a step to modulate spatially the unique light signal.

10. A non-transitory computer-readable medium comprising: instructions to implement the steps of a method according to claim 1 when said computer program is executed by a computer or by computing means.

11. A device for correcting the effect of a medium on a light signal having propagated through said medium, comprising at least one optical element whose spatial phase profile is individually adjustable and configured according to the method according to claim 1.

12. The device according to claim 11, wherein at least one optical element is a spatial light modulator or a deformable mirror.

13. A method for correcting the effect of a medium on a light signal having propagated through said medium, said method implementing a device comprising at least one optical element whose phase profile is individually adjustable, said method comprising:
- a configuration phase for configuring said device according to the method according to claim 1, and
- a correcting phase correcting said signal with said calibrated device.

14. The method according to claim 13, also comprising at least one adjusting step for adjusting the configuration of the device if changes occur in the medium during the correcting phase.

15. A system for configuring a device for correcting the effect of a medium on a light signal having propagated through said medium, said device comprising at least one optical element whose spatial phase profile is individually adjustable, said system comprising:
- means for propagating a first light signal through said medium, said medium thus providing a disordered signal;
- means for propagating said disordered signal through said device;
- means for propagating a second light signal, called reference signal, through said device, said reference signal being identical to said first signal;
- means for measuring an interference parameter between said disordered signal and said reference signal at the level of each optical element; and
- means for modifying the phase profile of at least one of said optical elements to increase said interference parameter.

16. The system according to claim 15, also comprising modulation means for modulating the reference signal before propagating said reference signal through the correcting device.

17. The system according to claim 15, wherein the measuring means comprise a CCD camera for each optical element.

18. The system according to claim 15, wherein the modifying means comprise at least one actuator for each optical element.

19. A system for correcting the effect of a medium on a light signal having propagated through said medium, said system comprising:
- a correcting device comprising at least one optical element whose spatial phase profile is individually adjustable, and
- a configuring system according to claim 15 to configure said device.

20. A method for configuring a device to apply a given deformation to a light signal, said device comprising at least one optical element whose spatial phase profile is individually adjustable, said method comprising the following steps:
- propagating a first light signal through a medium, said propagating step providing a reference signal;
- propagating said reference signal through said device;
- propagating a signal to deform through said device, said signal to deform being identical to said first signal;
- optimizing interference between said reference signal and said signal to deform, said optimizing step comprising at least one iteration of the following steps for at least one optical element:
- measuring at least one interference parameter between said reference signal and said signal to deform; and
- modifying the phase profile of at least one optical element depending on said interference parameter.

21. A system for configuring a device to apply a given deformation to a light signal, said device comprising at least one optical element whose spatial phase profile is individually adjustable, said system comprising:
- means for propagating a first light signal through a medium, said medium thus providing a reference signal;
- means for propagating said reference signal through said device;
- means for propagating a signal to deform through said device, said signal to deform being identical to said first signal;
- means for measuring an interference parameter between said reference signal and said signal to deform at the level of each optical element; and
- means for modifying the phase profile of at least one of said optical elements to increase said interference parameter.

22. A non-transitory computer-readable medium comprising: instructions to implement the steps of a method for configuring a device to correct the effect of a medium on a light signal having propagated through said medium, when said computer program is executed by a computer or by computing means, said device comprising at least one optical element whose spatial phase profile is individually adjustable, said method comprising the following steps:
- propagating a first light signal through said medium, said propagating step providing a reference signal;
- propagating said reference signal through said device;
- propagating a signal to deform through said device, said signal to deform being identical to said first signal;
- optimizing interference between said reference signal and said signal to deform, said optimizing step comprising at least one iteration of the following steps for at least one optical element:
- measuring at least one interference parameter between said reference signal and said signal to deform; and
- modifying the phase profile of at least one optical element depending on said interference parameter.

23. A device for applying a given deformation to a light signal, comprising at least one optical element whose spatial phase profile is individually adjustable and configured according to the following method:
- propagating a first light signal through a medium, said propagating step providing a reference signal;
- propagating said reference signal through said device;
- propagating a signal to deform through said device, said signal to deform being identical to said first signal;
- optimizing interference between said reference signal and said signal to deform, said optimizing step comprising at least one iteration of the following steps for at least one optical element:
- measuring at least one interference parameter between said reference signal and said signal to deform: and
- modifying the phase profile of at least one optical element depending on said interference parameter.

24. A method for applying a given deformation to a light signal, said method implementing a device comprising at least one optical element whose phase profile is individually adjustable, said method comprising:

a configuration phase for configuring said device, and
a deformation phase deforming said signal with said calibrated device;
said configuration phase comprising:
propagating a first light signal through a medium, said propagating step providing a reference signal:
propagating said reference signal through said device;
propagating a signal to deform through said device, said signal to deform being identical to said first signal;
optimizing interference between said reference signal and said signal to deform, said optimizing step comprising at least one iteration of the following steps for at least one optical element:
measuring at least one interference parameter between said reference signal and said signal to deform: and
modifying the phase profile of at least one optical element depending on said interference parameter.

25. A system for applying a given deformation to a light signal, said system comprising:

a deformation device comprising at least one optical element whose spatial phase profile is individually adjustable; and
a configuring system to configure said device, said configuring system comprising:
means for propagating a first light signal through a medium, said medium thus providing a reference signal;
means for propagating said reference signal through said device;
means for propagating a signal to deform through said device, said signal to deform being identical to said first signal;
means for measuring an interference parameter between said reference signal and said signal to deform at the level of each optical element; and
means for modifying the phase profile of at least one of said optical elements to increase said interference parameter.

* * * * *